(12) United States Patent
Liu et al.

(10) Patent No.: US 11,908,032 B2
(45) Date of Patent: Feb. 20, 2024

(54) METHOD FOR PLANNING COLLABORATIVE SEARCH-AND-RESCUE MISSIONS USING A PLURALITY OF SEARCH-AND-RESCUE EQUIPMENT IN MEDIUM TO FAR SEA AREAS

(71) Applicant: BEIHANG UNIVERSITY, Beijing (CN)

(72) Inventors: Hu Liu, Beijing (CN); Xin Li, Beijing (CN); Yongliang Tian, Beijing (CN); Siliang Liu, Beijing (CN)

(73) Assignee: Beihang University (CN)

( * ) Notice: Subject to any disclaimer, the term of this patent is extended or adjusted under 35 U.S.C. 154(b) by 0 days.

(21) Appl. No.: 18/206,919

(22) Filed: Jun. 7, 2023

(65) Prior Publication Data

US 2023/0401662 A1    Dec. 14, 2023

(51) Int. Cl.
| | |
|---|---|
| G06Q 50/26 | (2012.01) |
| G06Q 10/10 | (2023.01) |
| G06F 17/16 | (2006.01) |
| G01S 19/17 | (2010.01) |
| G01S 19/39 | (2010.01) |

(52) U.S. Cl.
CPC .......... *G06Q 50/265* (2013.01); *G01S 19/17* (2013.01); *G01S 19/39* (2013.01); *G06F 17/16* (2013.01); *G06Q 10/103* (2013.01)

(58) Field of Classification Search
CPC .... G06Q 50/265; G06Q 10/103; G01S 19/17; G01S 19/18; G01S 19/16; G01S 19/39; G06F 17/16

USPC ......................................................... 340/984
See application file for complete search history.

(56) References Cited

FOREIGN PATENT DOCUMENTS

| CN | 106951994 A | * | 7/2017 | .......... G06Q 10/043 |
|---|---|---|---|---|
| CN | 106971265 A | * | 7/2017 | ....... G06Q 10/06393 |
| CN | 111708916 A | * | 9/2020 | |
| CN | 111967656 A | * | 11/2020 | |
| CN | 112446811 A | * | 3/2021 | |

* cited by examiner

*Primary Examiner* — Kam Wan Ma

(57) ABSTRACT

A method for planning collaborative search-and-rescue missions using a plurality of search-and-rescue equipment in medium to far sea areas, includes: step 1: performing environmental modeling for maritime search-and-rescue missions; step 2: performing modeling for search-and-rescue modes using a plurality of search-and-rescue equipment; step 3: defining a maritime collaborative search-and-rescue mission planning model; based on the maritime collaborative search-and-rescue mission planning model, generating an overall matrix RP for the search-and-rescue mission planning using a plurality of search and rescue equipment; step 4: selecting target parameters, and defining a target function ƒ(RP) of the maritime collaborative search-and-rescue mission; based on an overall matrix RP of the maritime search-and-rescue mission environment model, the search-and-rescue mode model using a plurality of search-and-rescue equipment, and the overall matrix RP of the search-and-rescue mission planning using a plurality of search-and-rescue equipment, simulating and solving an objective function ƒ(RP).

5 Claims, 3 Drawing Sheets

METHOD FOR PLANNING COLLABORATIVE SEARCH-AND-RESCUE MISSIONS USING A PLURALITY OF SEARCH-AND-RESCUE EQUIPMENT IN MEDIUM TO FAR SEA AREAS

TECHNICAL FIELD

This invention generally relates to the technical field of modeling and simulation, and more particularly, to a method for planning collaborative search-and-rescue missions using a plurality of search-and-rescue equipment in medium to far sea areas.

BACKGROUND

Some countries have a long coastline and a vast marine territory. Therefore, quickly and safely performing search and rescue in medium to far sea areas becomes extremely important. However, conventional maritime search-and-rescue methods normally adopt a single mode and single equipment for performing search and rescue. These methods are mostly suitable for search and rescue for determined targets in near sea and shallow sea, failing to meet the requirement of performing search and rescue in the medium to far sea areas with high uncertainty and difficulty. Presently, a country's ability to perform search and rescue in medium to far sea areas is deficient. Therefore, how to plan missions to fully utilize a plurality of equipment and how to maximize the advantages of ships, helicopters and fixed-wing aircrafts (including amphibious aircrafts) in search and rescue in medium to far sea areas is an urgent problem to be solved.

SUMMARY

The purpose of the present invention is to provide a method for planning collaborative search-and-rescue missions using a plurality of search-and-rescue equipment in medium to far sea areas. According to the present invention, definition and quantitative evaluation of mission mode modeling and mission planning using a plurality of equipment for maritime search and rescue are realized, support to decision making and simulation verification is provided for search-and-rescue missions in medium to far sea areas, and prior problems relating to the low efficiency and low safety of search and rescue are solved.

To achieve the above purpose, the present invention adopts the following technical solution: a method for planning collaborative search-and-rescue missions using a plurality of search-and-rescue equipment in medium to far sea areas, comprising the steps of:
  Step 1: performing environmental modeling for maritime search-and-rescue missions;
  Step 2: performing modeling for search-and-rescue modes using a plurality of search-and-rescue equipment;
  Step 3: defining a maritime collaborative search-and-rescue mission planning model; based on the maritime collaborative search-and-rescue mission planning model, generating an overall matrix RP for the search-and-rescue mission planning using a plurality of search and rescue equipment;
  Step 4: selecting target parameters, and defining a target function $f(RP)$ of the maritime collaborative search-and-rescue mission; based on an overall matrix RP of the maritime search-and-rescue mission environment model, the search-and-rescue mode model using a plurality of search-and-rescue equipment, and the overall matrix RP of the search-and-rescue mission planning using a plurality of search-and-rescue equipment, simulating and solving an objective function $f(RP)$.

In another preferred embodiment of the present invention, step 1 comprising the steps of:
  Step 1.1: constructing a marine meteorological and hydrological information model;
  Step 1.2: constructing a battlefield situation information model;
  Step 1.3: constructing the position information of a target in danger, the time information, and an information model of a target in danger.

In another preferred embodiment of the present invention, step 12 comprising the steps of:
  Step 1.21: obtaining the situation information of, including the forces of first party and second parties near the target in danger during maritime search-and-rescue missions; performing structured description on the obtained situation information of first party, including the force of first party, the name of the support force, position information, support radius, support mode, support ability of second parties, as well as the behavior logic of first party;
  Step 1.22: obtaining the situation information of the third party, including third party threats in the maritime search-and-rescue mission; performing structured description on the obtained situation information of the third party, including the threat name, location information, threat radius, threat level, and behavior logic of the third party; when performing the search-and-rescue mission, the equipment of first party should avoid entering the threat radius of the third party.

In another preferred embodiment of the present invention, step 2 comprising the steps of:
  Step 2.1: constructing rules for collaborative missions using a plurality of search-and-rescue equipment;
  Step 2.2: constructing a mission mode process model, including a search mission mode, a salvage mission mode, a ship rescue mission mode, a fly-rope rescue mission mode, a seawater rescue mission mode, an air-drop rescue mission mode and a medical evacuation mission mode;
  Step 23: constructing a set of a plurality of search-and-rescue equipment mission modes.

In another preferred embodiment of the present invention, Step 21 comprising the steps of:
  First, defining a maritime search-and-rescue mission execution stage, including preparation, heading, search, salvage, rescue, medical evacuation and return;
  Subsequently, analyzing the types, attribute parameters and base positions of a plurality of search-and-rescue equipment, wherein the equipment includes rescue ships, helicopters, amphibious aircrafts and fixed-wing aircrafts; the attribute parameters include a cruising speed, a search speed, an available fuel quantity, a fuel consumption rate, and a maximum number of rescue personnel; the base position refers to longitude and latitude coordinates of a base where the search-and-rescue equipment is located;
  Finally, establishing a rule for the collaborative mission, wherein the collaborative mission includes a collaborative search, an assisted positioning and a collaborative rescue; when heading to a position of danger after preparation, each search-and-rescue equipment executes the mission according to a sequence of search, salvage, rescue and medical evacuation.

In another preferred embodiment of the present invention, step 3 comprising the steps of:

Step 3.1: defining a search-and-rescue force database according to the types and attribute parameters of the plurality of search-and-rescue equipment, wherein the data information of the search-and-rescue force database includes serial numbers, code numbers, types, performance parameters, base positions, and the set of mission modes;

Step 3.2: defining a dispatch matrix A of the search-and-rescue equipment, and representing a dispatch condition of the search-and-rescue equipment in the search-and-rescue force database:

$$A=[a_1,a_2,\ldots,a_n]^T;$$

wherein n represents the total number of the dispatched search-and-rescue equipment, wherein T is a transposition operator, wherein $a_i$ represents the serial number of the it h search-and-rescue equipment, and i=1, 2, ... n;

Step 3.3: defining a dispatch sequence matrix A5ft hethe search-and-rescue equipment, and representing a dispatch time of the search-and-rescue equipment:

$$AT=[t_1,t_2,\ldots,t_n]^T;$$

wherein n represents the total number of the dispatched search-and-rescue equipment, wherein T is a transposition operator, wherein $t_i$ represents the dispatch time of the $i^{th}$ search-and-rescue equipment, and i=1, 2, ... n;

Step 3.4: defining a dispatch waypoint matrix AW of the search-and-rescue equipment:

$$AW=[AW_1,AW_2,\ldots,AW_n]^T;$$

wherein n represents the total number of the dispatched search-and-rescue equipment, wherein T is a transposition operator, $AW_i$ represents a restriction to waypoints that the $i^{th}$ search-and-rescue equipment needs to be subjected to, and i=1, 2, ... n, wherein $AW_i$ represents a set of waypoints, which is expressed as:

$$AW_i=[w_{i1},w_{i2},\ldots,w_{ik}], (i=1,2,\ldots,n);$$

wherein k represents the number of waypoints in the set, wherein $w_{ij}$ represents the longitude and latitude coordinates of a waypoint, wherein i=1, 2, ... n and j=1, 2, ... k;

Step 3.5: describing a mission allocation condition of a disposal solution, and defining a mission allocation matrix AM:

$$AM=[AM_1,AM_2,\ldots,AM_n]^T;$$

wherein n represents the total number of the dispatched search-and-rescue equipment, wherein T is a transposition operator, wherein $AM_i$ describes a situation that the $i^{th}$ search-and-rescue equipment executes a mission, and i=1, 2, ... n, which is expressed as:

$$AM_i=[m_{i1},m_{i2},\ldots,m_{il}], (i=1,2,\ldots,n);$$

wherein l represents the number of search-and-rescue modes of the $i^{th}$ search-and-rescue equipment, wherein the value of $m_{il}$ is 0 or 1, wherein $m_{il}$ represents the mission allocation condition of the $i^{th}$ search-and-rescue equipment, wherein 0 represents that the mission mode is not executed, wherein 1 represents that the mission mode is executed;

Step 3.6: obtaining an overall matrix RP for the mission planning:

$$RP = [A, AT, AW, AM] = \begin{bmatrix} a_1 & t_1 & AW_1 & AM_1 \\ a_2 & t_2 & AW_2 & AM_2 \\ \vdots & \vdots & \vdots & \vdots \\ a_n & t_n & AW_n & AM_n \end{bmatrix}.$$

In another preferred embodiment of the present invention, step 4 further comprising the steps of:

Defining a target function $f(RP)$ by taking the average time of rescuing the persons in danger as a target parameter, wherein the target function of the maritime collaborative search-and-rescue mission is:

$$\min: f(RP) = \frac{1}{m}\sum_{s=1}^{m} r_s;$$

wherein $r_s$ represents the duration of the $s^{th}$ person in danger from falling into water to be successfully rescued, wherein m represents the number of persons in danger, and s=1, 2 ... m; if the $s^{th}$ person in danger is not rescued successfully, the duration is calculated following the time of completing the mission, and time of completing the mission is the time when each equipment completes all the missions and returns.

Compared with the prior art, the present invention has the following advantages:

1) The method of the present invention comprehensively considers the factors including the marine environment, situation, and persons in danger, making the planning of search-and-rescue missions more feasible while improving the safety of rescue;

2) The method of the present invention adopts a plurality of search-and-rescue equipment to perform collaborative search and rescue, and models the search-and-rescue modes using the plurality of search-and-rescue equipment in maritime search-and-rescue missions; meanwhile, through adopting the method of the present invention, the rules for rescue missions using a plurality of search-and-rescue equipment are defined, and efficient search and rescue in medium to far sea areas are achieved; moreover, the method of the present invention allows the search-and-rescue missions to be simulated and evaluated such that a foundation is laid for the evaluation of feasibility of the search and rescue;

3) According to the method of the present invention, the search-and-rescue forces are described from three dimensions: the temporal attribute of the dispatch of search-and-rescue forces, the spatial attribute of the dispatch of search-and-rescue forces, and the mission attribute of the planning; by means of quantitatively evaluating the mission planning using target functions, the effect of the search and rescue can be predicted such that a better search-and-rescue plan is selected.

BRIEF DESCRIPTION OF THE DRAWINGS

The drawings are merely used for an illustrative purpose and are not intended to limit the present invention. In the drawings, the same reference marks represent the same components.

DETAILED DESCRIPTION

Figure 1:
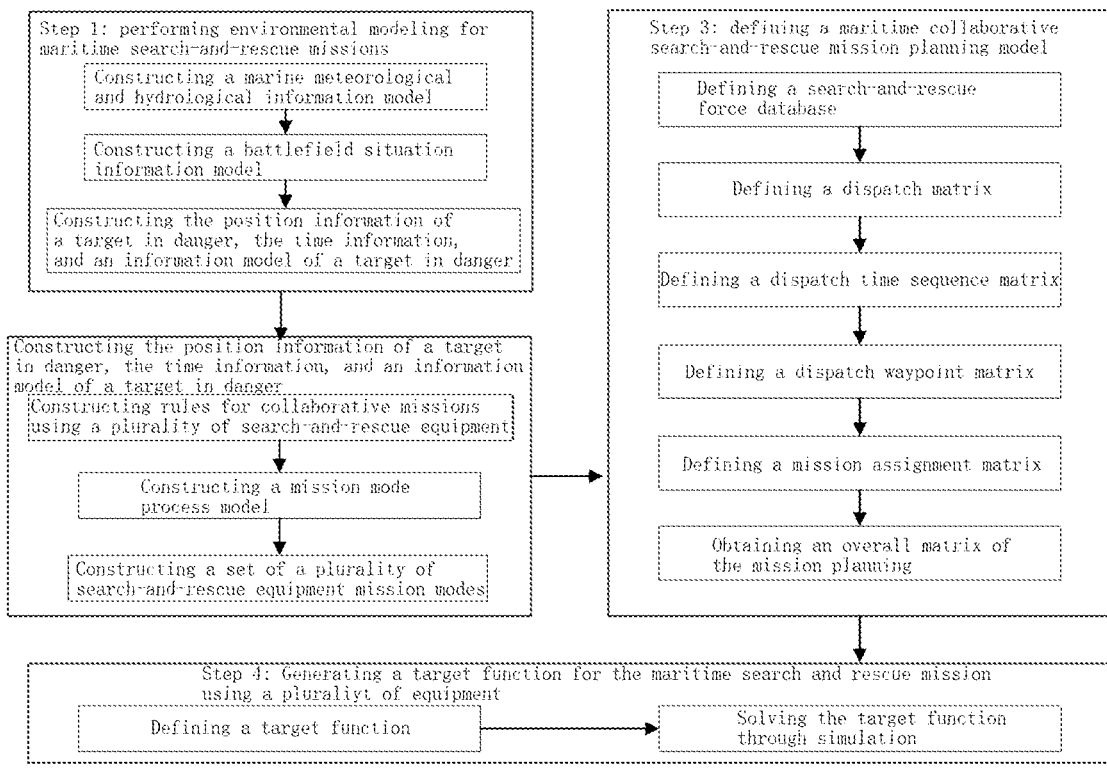
FIG. 1 is a flow chart illustrating the method for planning collaborative search-and-rescue missions using a plurality of search-and-rescue equipment in medium to far sea areas of the present invention.

Detailed embodiments are combined hereinafter to further elaborate the technical solution of the present invention. The drawings are a part of the present invention, which are used to explain the principles of the present invention together with the embodiments of the present invention but not intended to limit the scope of the present invention.

The present invention provides a method for planning collaborative search-and-rescue missions using a plurality of search-and-rescue equipment in medium to far sea areas, comprising the steps of:

Step 1: performing environmental modeling for maritime search-and-rescue missions;

Step 2: performing modeling for search-and-rescue modes using a plurality of search-and-rescue equipment;

Step 3: defining a maritime collaborative search-and-rescue mission planning model; based on the maritime collaborative search-and-rescue mission planning model, generating an overall matrix RP for the search-and-rescue mission planning using a plurality of search and rescue equipment;

Step 4: selecting target parameters, and defining a target function $f(RP)$ of the maritime collaborative search-and-rescue mission; based on an overall matrix RP of the maritime search-and-rescue mission environment model, the search-and-rescue mode model using a plurality of search-and-rescue equipment, and the overall matrix RP of the search-and-rescue mission planning using a plurality of search-and-rescue equipment, simulating and solving an objective function $f(RP)$, thereby realizing the planning and quantitative evaluation of the maritime collaborative search-and-rescue mission;

According to the present invention, the factors of danger, the search-and-rescue force of first party and the third party force are comprehensively considered. Moreover, through combining the collaborative planning using a plurality of search-and-rescue equipment, the high-efficient and safe search and rescue in medium to far sea areas are realized.

Figure 2:
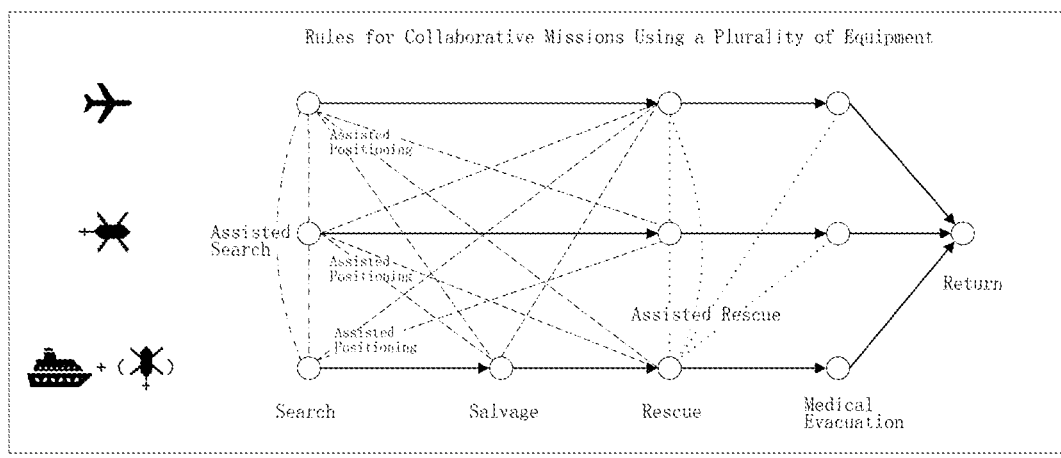
FIG. 2 is a schematic diagram illustrating rules for executing a collaborative mission using a plurality of search-and-rescue equipment of the present invention.
Figure 3:
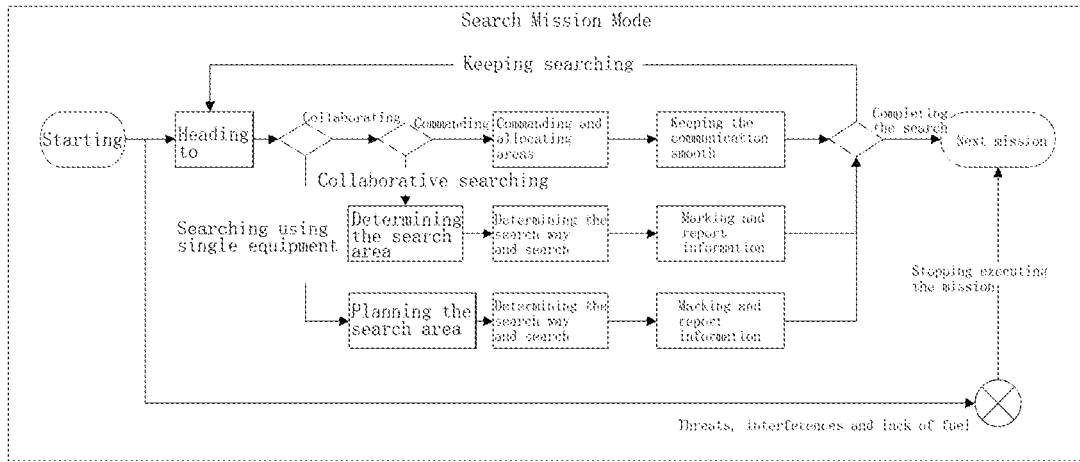
FIG. 3 is a schematic diagram illustrating the search mission mode using a plurality of search-and-rescue equipment of the present invention.
Figure 4:
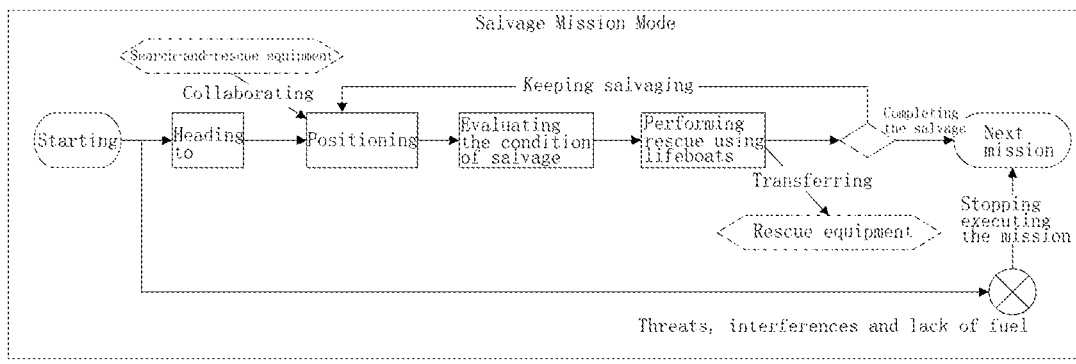
FIG. 4 is a schematic diagram illustrating the salvage mission mode using a plurality of search-and-rescue equipment of the present invention.
Figure 5:
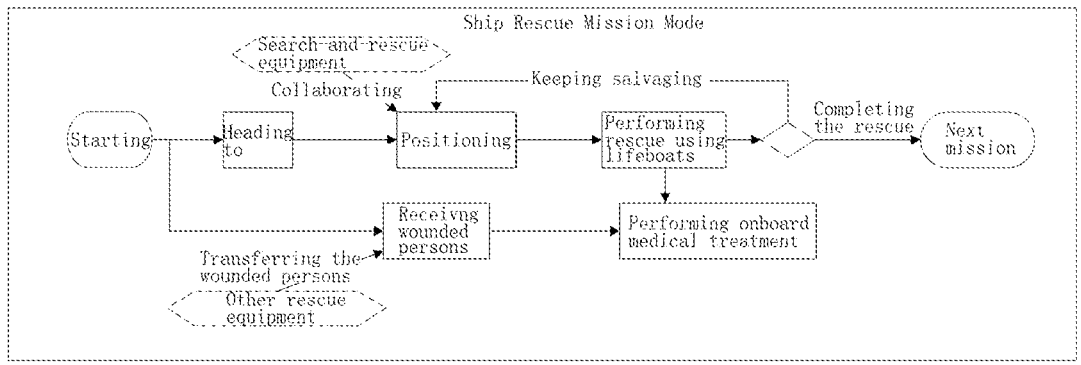
FIG. 5 is a schematic diagram illustrating the ship rescue mission mode using a plurality of search-and-rescue equipment of the present invention.
Figure 6:
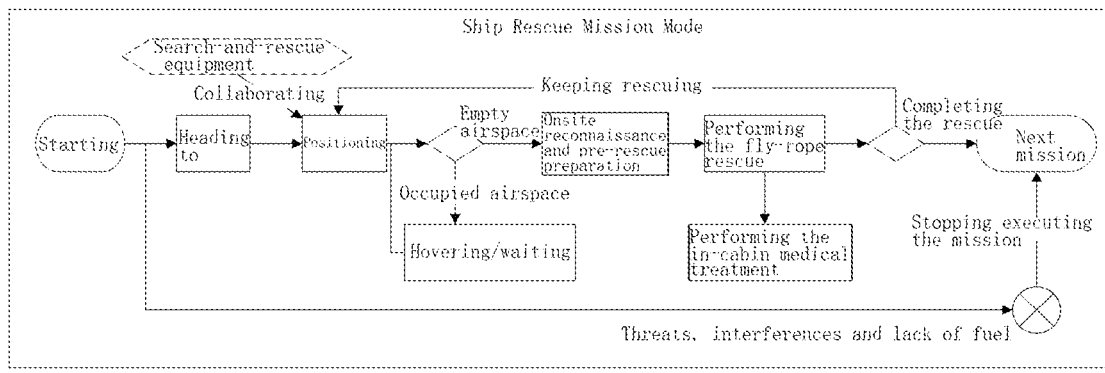
FIG. 6 is a schematic diagram illustrating the fly-rope rescue mission mode using a plurality of search-and-rescue equipment of the present invention.
Figure 7:
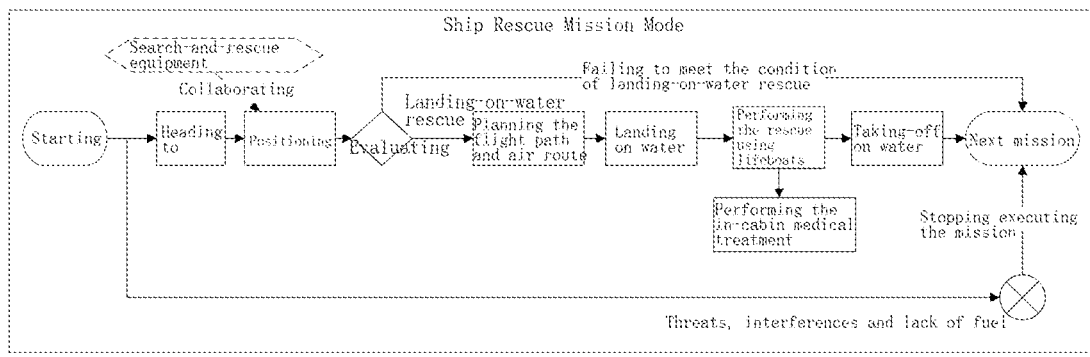
FIG. 7 is a schematic diagram illustrating the landing-on-water rescue mission mode using a plurality of search-and-rescue equipment of the present invention.
Figure 8:
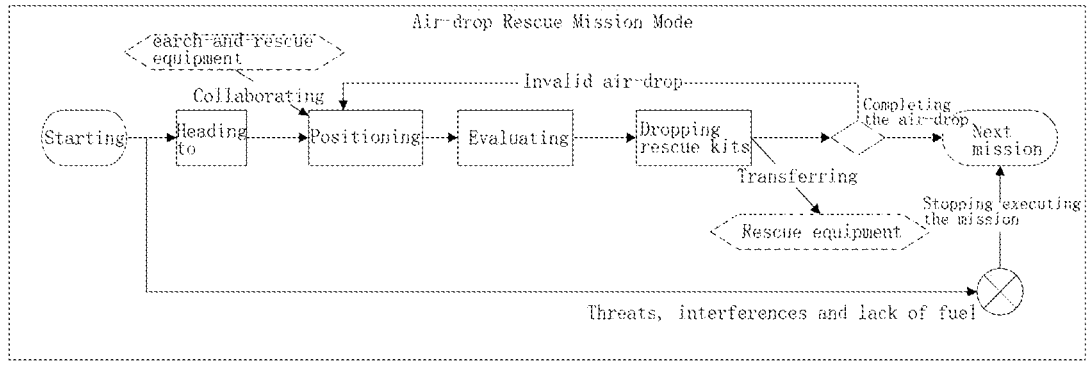
FIG. 8 is a schematic diagram illustrating the air-drop rescue mission mode using a plurality of search-and-rescue equipment of the present invention.
Figure 9:
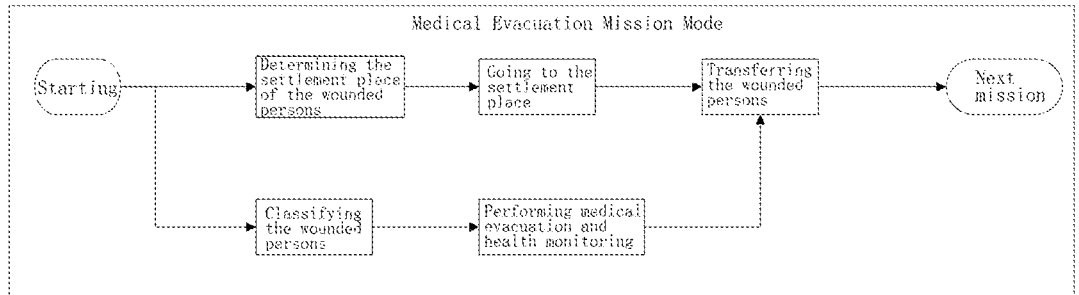
FIG. 9 is a schematic diagram illustrating the medical evacuation mission mode using a plurality of search-and-rescue equipment of the present invention.

Further, step 1 comprising the steps of:

Step 1.1: constructing a marine meteorological and hydrological information model, including a wind field, a flow field, a marine condition level and a seawater average temperature;

Step 1.2: constructing a battlefield situation information model, including the situation information of first party and/or third party that directly affects the maritime search and rescue;

Step 1.3: constructing the position information of a target in danger, the time information, and an information model of a target in danger, wherein the information of a target in danger includes the information of equipment in danger and status information of persons in danger, wherein the situation information of the persons in danger includes the unknown number of persons who have fallen into the seawater, the number of persons who have fallen into the seawater waiting for rescue, the status of the persons who have fallen into the seawater waiting for rescue, the estimated drifting trajectory of the persons who have fallen into the seawater waiting for rescue along the variation of time, the estimated survival time of the persons who have fallen into the seawater waiting for rescue, and the estimated survival time of the persons who have fallen into the seawater with unknown conditions;

Further, step 1.2 comprising the steps of:

Step 1.21: obtaining the situation information of first party, including the forces of first party and second parties near the target in danger during maritime search-and-rescue missions; performing structured description on the obtained situation information of first party, including the force of first party, the name of the support force, position information, support radius, support mode, support ability of second parties, as well as the behavior logic of first party, wherein the behavior logic of first party refers to a logic that first party and second parties participate in search-and-rescue missions as search-and-rescue forces;

Step 1.22: obtaining the situation information of the third party, including third party threats in the maritime search-and-rescue mission; performing structured description on the obtained situation information of the third party, including the threat name, location information, threat radius, threat level, and behavior logic of the third party, wherein the behavior logic of the third party refers to a logic such as reconnaissance, interference and strike; when performing the search-and-rescue mission, the equipment of first party should avoid entering the threat radius of the third party;

Further, step 2 comprising the steps of:

Step 2.1: constructing rules for collaborative missions using a plurality of search-and-rescue equipment;

First, defining a maritime search-and-rescue mission execution stage, including preparation, heading, search, salvage, rescue, medical evacuation and return;

Subsequently, analyzing the types, attribute parameters and base positions of a plurality of search-and-rescue equipment, wherein the equipment includes rescue ships, helicopters, amphibious aircrafts and fixed-wing aircrafts; if the rescue ship is a common rescue ship, the common rescue ship, the helicopter, and the amphibious aircraft separately execute a search-and-rescue mission, and if the rescue ship is a rescue ship with a helipad, the rescue ship with a helipad and the helicopter form a combined search-and-rescue force; the attribute parameters include a cruising speed, a search speed, an available fuel quantity, a fuel consumption rate, and a maximum number of rescue personnel; the base position refers to longitude and latitude coordinates of a base where the plurality of search-and-rescue equipment is located;

Finally, establishing a rule for the collaborative mission, wherein the collaborative mission includes a collaborative search, an assisted positioning and a collaborative rescue; as shown in FIG. 2, when heading to a position of danger after preparation, each search-and-rescue equipment executes the mission according to a sequence of search, salvage, rescue and medical evacuation; the collaborative search is that a plurality of search-and-rescue equipment respectively search in their areas; the assisted positioning is that, after a target in danger is found, the search-and-rescue equipment performing a search mission reports a precise position of the target in danger to the search-and-rescue equipment performing a salvage mission or a rescue mission, thereby enabling them to learn the precise information such that the missions are performed precisely; the collaborative rescue is that, when the plurality of search-and-rescue equipment performs the rescue mission, the helicopter and amphibious aircraft performing the rescue mission immediately transfer the persons in danger to the rescue ship such that the rescue efficiency is significantly improved;

Step 2.2: constructing a mission mode process model, including a search mission mode, a salvage mission mode, a ship rescue mission mode, a fly-rope rescue mission mode, a seawater rescue mission mode, an air-drop rescue mission mode and a medical evacuation mission mode; the process of each mode is shown in FIGS. 3 to 9; the search mission mode is performed in the search mission stage, the salvage mission mode is performed in the salvage mission stage, the ship rescue mission mode, the fly-rope rescue mission mode, the seawater rescue mission mode and/or the air-drop rescue mission mode are performed in the rescue mission stage, and the medical evacuation mission mode is performed in the medical evacuation mission stage;

The process of the search mission mode is: when the search-and-rescue equipment executing the search mission heads to the position of the target in danger, judging whether to perform a collaborative search mode or a single search mode: if a single search mode is adopted, performing a regional planning, determining a search method, searching, marking the target and reporting information; if a collaborative search mode is adopted, determining a command relationship: designating one of the plurality of search-and-rescue equipment executing a search mission to command other search-and-rescue equipment executing a search mission while being responsible for allocating the search areas, keeping the communication smooth, and coordinating with other search-and-rescue equipment to search in a specified manner, mark the target and report information; after the search-and-rescue equipment executing the search mission completes the search in the current area, determining whether to head to a new area for searching, and if the search is completed, executing a next mission; in the process of executing the mission, if a threat, an interference, or a lack of fuel occurs, stopping executing the current mission and executing a next mission;

The process of the salvage mission mode is: when the search-and-rescue equipment executing the salvage mission heads to the position of a target in danger, precisely positioning the target with the assistance of the search-and-rescue equipment executing the search mission, putting down a deep submergence rescue vehicle after evaluating the salvage condition, and transferring the rescued persons to the search-and-rescue equipment executing the ship rescue mission; after the search-and-rescue equipment executing the salvage mission completes the current salvage, determining whether the salvage mission needs to be continued, and if the mission is completed, executing a next mission; in the process of executing the mission, if a threat, an interference, or a lack of fuel occurs, stopping executing the current mission and executing a next mission;

The process of the ship rescue mission mode is: when the search-and-rescue equipment executing the ship rescue mission heads to the position of a target in danger, precisely positioning the target with the assistance of the search-and-rescue equipment executing the search mission, performing the rescue using lifeboats, and performing the on-board medical treatment on the rescued persons; meanwhile, with the assistance of the search-and-rescue equipment executing a search mission, receiving wounded persons transferred from other search-and-rescue equipment, and performing on-board medical treatment on the wounded persons; after the search-and-rescue equipment executing the ship rescue mission completes the current rescue, determining whether the rescue mission needs to be continued, and if the mission is completed, executing a next mission; in the process of executing the mission, if a threat, an interference, or a lack of fuel occurs, stopping executing the current mission and executing a next mission; the process of the fly-rope rescue mission mode is: when the helicopter goes to the position of a target in danger, precisely positioning the target with the assistance of the search-and-rescue equipment executing the search mission, and judging the condition of the airspace; if the airspace is full, hovering and waiting until the airspace is empty; if the airspace is empty, performing on-site reconnaissance and pre-rescue preparation, performing the fly-rope rescue, and performing the in-cabin medical treatment on the wounded persons; after the helicopter completes the current rescue, determining whether the rescue mission needs to be continued, and if the mission is completed, executing a next mission; in the process of executing the mission, if a threat, an interference, or a lack of fuel occurs, stopping executing the current mission and executing a next mission;

The process of the seawater rescue mission mode is: when the amphibious aircraft goes to the position of a target in danger, precisely positioning the target with the assistance of the search-and-rescue equipment executing the search mission, and evaluating the condition of the seawater rescue; if the condition of the seawater rescue is not met, executing a next mission, and if seawater rescue is feasible, planning the air route, landing on water, performing the rescue using lifeboats, performing the in-cabin medical treatment on the wounded persons, taking off and executing a next mission; in the process of executing the mission, if a threat, an interference, or a lack of fuel occurs, stopping executing the current mission and executing a next mission;

The process of the air-drop rescue mission mode is: when the search-and-rescue equipment (helicopter or aircraft) goes to the position of a target in danger, precisely positioning the target with the assistance of the search-and-rescue equipment executing the search mission, evaluating the condition of the air-drop rescue and air-dropping rescue kits; after the search-and-rescue equipment (helicopter or aircraft) executing the air-drop rescue mission completes the current rescue mission, determining whether the air-drop is valid; if the air-drop is invalid, positioning again for air-drop, and if the air-drop is valid, executing a next mission; in the process of executing the mission, if a threat, an interference, or a lack of fuel occurs, stopping executing the current mission and executing a next mission;

The process of the medical evacuation mission mode is: determining a settlement place for the rescued persons, going to the settlement place, transferring the rescued persons, classifying the rescued persons, performing the medical treatment on the wounded persons and monitoring their health conditions by the search-and-rescue equipment executing the medical evacuation mission; after the wounded persons are transferred, executing a next mission;

Step 2.3: constructing a set of a plurality of search-and-rescue equipment mission modes, wherein a rescue ship is capable of executing a search mission mode, a salvage mission mode, a ship rescue mission mode and a medical evacuation mission mode, a helicopter is capable of executing a search mission mode, a fly-rope rescue mission mode, an air-drop rescue mission mode and a medical evacuation mission mode, an amphibious aircraft is capable of executing a search mission mode, an air-drop rescue mission mode, a seawater rescue mission mode and a medical evacuation mission mode, and the fixed-wing aircraft is capable of executing a search mission mode and an air-drop rescue mission mode; the set of the plurality of search-and-rescue equipment mission modes are as shown in Table 1:

TABLE 1

A Set of a Plurality of Search-and-rescue Equipment Mission Modes

| Equipment | Set of Mission Modes |
| --- | --- |
| Rescue Ship | Search, salvage, ship rescue and medical evacuation |
| Helicopter | Search, fly-rope rescue, air-drop rescue and medical evacuation |
| Fixed-wing aircraft | Search and air-drop rescue |
| Amphibious aircraft | Search, landing-on-water rescue, air-drop rescue and mecical evacuation |

Further, step 3 comprising the steps of:

Step 3.1: defining a search-and-rescue force database according to the types and attribute parameters of the plurality of search-and-rescue equipment, wherein the data information of the search-and-rescue force database includes serial numbers, code numbers, types, performance parameters, base positions, and the set of mission modes; the search-and-rescue force database is shown in Table 2:

TABLE 2

Rescue Force Database

| Parameters | Data Type | Definition and Description |
| --- | --- | --- |
| Serial Number | Natural Number | Representing the serial number of a plurality of search-and-rescue equipment, increasing sequentially from 0, 0, 1, 2, 3 . . . |
| Code number | Character String | The code nubmer of the search-and-rescue equipment, also known as an identification number, is represented in the form of a letter + number, such as "B-7232". |
| Type | Natural Number | Values 1, 2, 3 and 4 sequentially correspond to a rescue ship, helicopter, fixed-wing aircraft and amphibious aircraft. |
| Attribute Parameter | Storing the types of the attribute parameters | Corresponding to the types, it is used to store performance parameters of equipment, including a rescue ship, helicopter, fixed-wing aircraft and amphibious aircraft; the attribute parameters include the cruise speed, search speed, available fuel quantity, fuel consumption rate, and maximum number of rescuers. |
| Base Position | Longitude and Latitude Coordinates | The latitude and longitude coordinates of the base where the search-and-rescue equipment is located. |
| Set of Mission Modes | Set | The set of the mission modes that the search-and-rescue equipment (e.g., helicopters) is capable of executing is normally: search, fly-rope rescue, air-drop rescue and medical evacuation). |

Step 3.2: defining a dispatch matrix A of the search-and-rescue equipment, and representing a dispatch condition of the search-and-rescue equipment in the search-and-rescue force database:

$$A=[a_1,a_2,\ldots,a_n]^T;$$

wherein n represents the total number of the dispatched search-and-rescue equipment, wherein T is a transposition operator, wherein $a_i$ represents the serial number of the $i^{th}$ search-and-rescue equipment, and i=1, 2, . . . n; it is worth mentioning that, if a certain value of the dispatch matrix A appears for multiple times, it indicates that the same search-and-rescue equipment executes search-and-rescue missions for multiple times;

Step 33: defining a dispatch sequence matrix AT of the search-and-rescue equipment, and representing a dispatch time of the search-and-rescue equipment:

$$AT=[t_1,t_2,\ldots,t_n]^T;$$

wherein n represents the total number of the dispatched search-and-rescue equipment, wherein T is a transposition operator, wherein $a_i$ represents the dispatch time of the $i^{th}$ search-and-rescue equipment, and i=1, 2, . . . n;

Step 3.4: defining a dispatch waypoint matrix AW of the search-and-rescue equipment:

$$AW=[AW_1,AW_2,\ldots,AW_n]^T;$$

wherein n represents the total number of the dispatched search-and-rescue equipment, wherein T is a transposition operator, $AW_i$ represents a restriction to waypoints that the $i^{th}$ search-and-rescue equipment needs to be subjected to, and i=1, 2, . . . n, wherein $AW_i$ represents a set of waypoints, which is expressed as:

$$AW_i=[w_{i1},w_{i2},\ldots,w_{ik}],\ (i=1,2,\ldots,n);$$

wherein k represents the number of waypoints in the set, wherein $w_{ij}$ represents the longitude and latitude coordinates of a waypoint, wherein i=1, 2, . . . n and j=1, 2, . . . k;

Step 3.5: describing a mission allocation condition of a disposal solution, and defining a mission allocation matrix AM:

$$AM=[AM_1, AM_2, \ldots, AM_n]^T;$$

wherein n represents the total number of the dispatched search-and-rescue equipment, wherein T is a transposition operator, wherein $AM_i$ describes a situation that the $i^{th}$ search-and-rescue equipment executes a mission, and i=1, 2, . . . n, which is expressed as:

$$AM_i=[m_{i1}, m_{i2}, \ldots, m_{il}], (i=1,2, \ldots, n);$$

wherein l represents the number of search-and-rescue modes of the $i^{th}$ search-and-rescue equipment, wherein the value of $m_{il}$ is 0 or 1, wherein ma represents the mission allocation condition of the $i^{th}$ search-and-rescue equipment, wherein 0 represents that the mission mode is not executed, wherein 1 represents that the mission mode is executed; for instance, the first search-and-rescue equipment is a rescue ship, and $AM_1$ is expressed as $AM_1=[1,0,1,1]$;

Because the set of mission modes of the rescue ship is {search, salvage, ship rescue, and medical evacuation}, then the value of AM 1 indicates that the rescue ship needs to execute search, ship rescue, and medical evacuation;

Step 3.6: obtaining an overall matrix RP for the mission planning:

$$RP = [A, AT, AW, AM] = \begin{bmatrix} a_1 & t_1 & AW_1 & AM_1 \\ a_2 & t_2 & AW_2 & AM_2 \\ \vdots & \vdots & \vdots & \vdots \\ a_n & t_n & AW_n & AM_n \end{bmatrix} \circ$$

Further, step 4 comprising the steps of:

Step 4.1: selecting a target parameter, defining an objective function of the mission of the search-and-rescue equipment based on the overall matrix RP, and describing the effect of the mission by using the objective function:

min: $f(RP)$;

wherein $f(RP)$ represents an objective function, and the target parameter is an expression of $f(RP)$, wherein the result of the objective function is affected by the overall matrix RP for the mission planning, wherein min represents that the smaller the result of the objective function is, the better the solution is; the definition of the objective function depends on the point of interest of the mission, namely, the target parameter being not unique; the calculation of the objective function needs to be combined with the simulation;

Step 4.2: based on the maritime search-and-rescue mission environment model, the search-and-rescue mode model using a plurality of search-and-rescue equipment, and the overall matrix RP of the search-and-rescue mission planning using a plurality of search-and-rescue equipment, obtaining a result of the objective function $f(RP)$ by means of simulating calculation, wherein the maritime search-and-rescue mission environment model and the search-and-rescue mode model using a plurality of search-and-rescue equipment form a simulation environment, wherein the overall matrix RP for the mission planning serves as an input parameter, and the target function $f(RP)$ serves as an output result, wherein for the same simulation environment, the smaller the result of the objective function $f(RP)$ is, the better the overall matrix RP of the mission planning is.

Embodiment 1

In this embodiment, based on the method for planning collaborative search-and-rescue missions using a plurality of search-and-rescue equipment in medium to far sea areas, comparing the solution using an amphibious aircraft as the search-and-rescue force and the solution using a helicopter as the search-and-rescue force, comprising the steps of:

Step 1: performing environment modeling on maritime search and rescue;

Determining the scenario information of the danger situation, wherein the scenario information of the danger situation is: on Mar. 1, 2022, a large ship capsized in a certain area of the South China Sea at 6:00 am; a distress signal was sent out through a life-saving radio station, and 27 crew members were waiting for rescue in lifeboats; the situation of the other three crew members falling into the seawater was unknown, and the sea condition at the scene was level 4; collaborative search and rescue were required; the scenario information for the search and rescue environment is:

| | |
|---|---|
| Danger Information | A ship capsized |
| Position | A certain area of the South China Sea |
| Latitude and longitude coordinates | (112.77, 20.008) |
| Level of Sea Condition | Level 4 |
| Time | Mar. 1, 2022 6:00:00 am | obtaining the marine meteorological and hydrological information at this point and location, including a wind field, a flow field, a marine condition level and a seawater average temperature;

obtaining the situation information of first party and/or third party that directly affects the maritime search and rescue;

Step 2: modeling search-and-rescue modes for a plurality of search-and-rescue equipment;

Step 3: defining a maritime collaborative search-and-rescue mission planning model and generating an overall matrix RP for the search-and-rescue mission planning using the plurality of search-and-rescue equipment;

3.1 The given search-and-rescue force information is shown in Table 3, including an AG600 amphibious aircraft, two Z-9 helicopters, and a Nanhai 102 rescue ship,

TABLE 3

Given Search-and-rescue Force Database

| No. | Code No. | Type | Attribute Parameters | Position of Base |
|---|---|---|---|---|
| 0 | B-1001 | 4 | AG600 (Amphibious aircraft) | (113.374, 22.005) |
| 1 | B-2002 | 2 | Z-9 (Helicopter) | (113.374, 22.005) |
| 2 | B-2003 | 2 | Z-9 (Helicopter) | (113.374, 22.005) |
| 3 | NHJ-001 | 1 | Nanhai Rescue 102 (Rescue ship) | (111.655, 21.521) | wherein the mission modes of AG600, Z9, and Nanhai Rescue 102 are:

$M_{AG600}$={search, landing on water, airdrop rescue, medical evacuation};

$M_{Z9}$={search, flyrope rescue, airdrop rescue, medical evacuation};

$M_{Nanhai\ Rescue\ 102}$={search, salvage, ship rescue, medical evacuation};

3.2 Building a solution for comparing the simulation tests, thereby generating an overall matrix RP for the maritime collaborative search-and-rescue mission, wherein solution 1 is that one amphibious aircraft is dispatched to assist a rescue ship to execute missions including the search, landing-on-water rescue and medical evacuation, and solution 2 is that two helicopters are dispatched to assist a rescue ship to execute missions including the search, fly-rope rescue and medical evacuation;

$$RP_1 = [A, AT, AW, AM] = \begin{bmatrix} 0 & 0 & 0 & [1,1,0,1] \\ 3 & 0 & 0 & [0,0,1,1] \end{bmatrix}; \quad \text{Solution 1}$$

$$RP_2 = [A, AT, AW, AM] = \begin{bmatrix} 1 & 0 & 0 & [1,1,0,1] \\ 2 & 0 & 0 & [1,1,0,1] \\ 3 & 0 & 0 & [0,0,1,1] \end{bmatrix}; \quad \text{Solution 2}$$

It is worth mentioning that, taking a null value of 0 in the AW matrix of the dispatch waypoints indicates that the route is automatically planned according to the rule of the shortest path;

Step 4: first, generating a target function $f(RP)$ of the maritime collaborative search-and-rescue mission based on the overall matrix RP generated in step 3, and defining a target function $f(RP)$ by taking the average time of rescuing the persons in danger as a target parameter:

$$\min: f(RP) = \frac{1}{m} \sum_{s=1}^{m} r_s;$$

wherein $f(RP)$ represents a target function, wherein min represents that the smaller the result of the objective function is, the better the solution is, wherein $r_s$ represents the duration of the $s^{th}$ person in danger from falling into water to be successfully rescued, wherein m represents the number of persons in danger, and s=1, 2 ... m; if the $s^{th}$ person in danger is not rescued successfully, the duration is calculated following the time of completing the mission, and time of completing the mission is the time when each equipment completes all the missions and returns;

Second, inputting solution 1 and solution 2 of the mission planning of the search-and-rescue equipment based on the constructed maritime search-and-rescue mission environment model and the search-and-rescue mode model using a plurality of search-and-rescue equipment, performing simulation, and solving an objective function of the maritime search-and-rescue mission;

Based on the simulation result, the calculation result of the objective function of $RP_1$ is 76.5, the calculation result of the objective function of $RP_2$ is 113.2, and the average time of rescuing the persons in danger of $RP_1$ is 32.4% faster than that of $RP_2$, indicating that the efficiency of executing search-and-rescue missions in medium to far sea areas using an amphibious aircraft is superior to the efficiency of executing the search-and-rescue missions using two helicopters.

Furthermore, the aforesaid is merely the description of some embodiments, and changes, modifications, additions, and/or variations may be made without departing from the scope and spirit of the disclosed embodiments, which are illustrative and not restrictive. Furthermore, the aforesaid relates to embodiments that are presently considered to be the most practical and most preferred embodiments. It should be understood that, the embodiments are not to be limited to the disclosed embodiments, but on the contrary, are intended to cover different modifications and equivalent arrangements included within the spirit and scope of these embodiments. In addition, various embodiments described above may be applied in conjunction with other embodiments, for instance, one embodiment may be combined with aspects of another embodiment to implement another embodiment. Moreover, the individual features or components of any given assembly may constitute additional embodiments.

The aforesaid description of embodiments is used for purpose of illustration and is not intended to be exhaustive or to limit the present invention. Various elements or features of a particular embodiment are generally not limited to this particular embodiment, but where applicable, even if not specifically shown or described, various elements or features are also interchangeable and may be used in a selected embodiment, and may also be varied in a variety of ways. This change is not to be regarded as a departure from the present invention, and all such changes are included within the scope of the present invention.

Therefore, it should be understood that the drawings and the description are provided by way of example for facilitating the understanding of the present invention and should not constitute a limitation on the scope of the present invention.

What is claimed is:

1. A method for planning collaborative search-and-rescue missions using a plurality of search-and-rescue equipment in medium to far sea areas, comprising the steps of:
   step 1: performing environmental modeling for maritime search-and-rescue missions, and obtaining a maritime search-and-rescue mission environment model;
   step 2: performing modeling for search-and-rescue modes using the plurality of search-and-rescue equipment, and obtaining a search-and-rescue mode model;
   step 3: defining a maritime collaborative search-and-rescue mission planning model; based on the collaborative search-and-rescue mission planning model, generating an overall matrix RP for a search-and-rescue mission planning using the plurality of search-and-rescue equipment;
   step 4: selecting target parameters, and defining a target function $f(RP)$ of the collaborative search-and-rescue missions based on the target parameters; based on the maritime search-and-rescue mission environment model, the search-and-rescue mode model using the plurality of search-and-rescue equipment, and the overall matrix RP of the search-and-rescue mission planning using the plurality of search-and-rescue equipment, simulating and solving an objective the target function $f(RP)$,
   wherein step 1 further comprises the steps of:
   step 1.1: constructing a marine meteorological and hydrological information model;
   step 1.2: constructing a battlefield situation information model;

step 1.3: constructing a position information of a target in danger, a time information, and an information model of the target in danger;

wherein step 1.2 further comprises the steps of:

step 1.21: obtaining a first situation information of a first party, wherein the first situation information of the first party includes forces of the first party and second parties supporting the first party near the target in danger during maritime search-and-rescue missions; performing a first structured description on the first situation information of the first party, wherein the first structured description includes name, support force, position information, support radius, support mode, support ability of second parties supporting the first party, the forces of the first party, and a behavior logic of the first party;

step 1.22: obtaining a second situation information of a third party threatening the first party, wherein the second situation information of the third party threatening the first party includes third party threats in the maritime search-and-rescue missions; performing a second structured description on the second situation information of the third party, wherein the second structured description includes threat name, location information, threat radius, threat level, and behavior logic of the third party; when performing the collaborative search-and-rescue missions, equipment of the first party should avoid entering the threat radius of the third party.

2. The method for planning collaborative search-and-rescue missions using a plurality of search-and-rescue equipment in medium to far sea areas of claim 1, wherein step 2 comprising the steps of:

step 2.1: constructing rules for collaborative search-and-rescue missions using the plurality of search-and-rescue equipment;

step 2.2: constructing a mission mode process model, wherein the mission mode process model includes a search mission mode, a salvage mission mode, a ship rescue mission mode, a fly-rope rescue mission mode, a seawater rescue mission mode, an air-drop rescue mission mode and a medical evacuation mission mode;

step 2.3: constructing a set of a plurality of search-and-rescue equipment mission modes by selecting corresponding mission modes in the mission mode process model for each search-and-rescue equipment according to the rules for collaborative search-and-rescue missions.

3. The method for planning collaborative search-and-rescue missions using a plurality of search-and-rescue equipment in medium to far sea areas of claim 2, wherein step 2.1 comprising the steps of:

first, defining a maritime search-and-rescue mission execution stage, including preparation, heading, search, salvage, rescue, medical evacuation and return;

subsequently, analyzing types, attribute parameters and base positions of the plurality of search-and-rescue equipment, wherein the plurality of search-and-rescue equipment includes rescue ships, helicopters, amphibious aircrafts and fixed-wing aircrafts; the attribute parameters include a cruising speed, a search speed, an available fuel quantity, a fuel consumption rate, and a maximum number of rescue personnel; the base positions refers to longitude and latitude coordinates of a bases where the search-and-rescue equipment is located;

finally, establishing a rule for the collaborative search-and-rescue missions, wherein the collaborative search-and-rescue missions includes a collaborative search, an assisted positioning and a collaborative rescue; when heading to a position of danger after preparation, each search-and-rescue equipment executes the collaborative search-and-rescue missions according to a sequence of search, salvage, rescue and medical evacuation.

4. The method for planning collaborative search-and-rescue missions using a plurality of search-and-rescue equipment in medium to far sea areas of claim 3, wherein step 3 comprising the steps of:

step 3.1: defining a search-and-rescue force database according to the types and attribute parameters of the plurality of search-and-rescue equipment, wherein a data information of the search-and-rescue force database includes serial numbers, code numbers, types, performance parameters, base positions, and the set of the plurality of search-and-rescue equipment mission modes;

step 3.2: defining a dispatch matrix A of the plurality of search-and-rescue equipment, and representing a dispatch condition of the plurality of search-and-rescue equipment in the search-and-rescue force database:

$$A=[a_1, a_2, \ldots, a_n]^T;$$

wherein n represents total number of dispatched search-and-rescue equipment, wherein T is a transposition operator, wherein $a_i$ represents serial number of $i^{th}$ search-and-rescue equipment, and i=1, 2, ... n;

step 33: defining a dispatch sequence matrix AT of the plurality of search-and-rescue equipment, and representing a dispatch time of the plurality of search-and-rescue equipment:

$$AT=[t_1, t_2, \ldots, t_n]^T;$$

wherein n represents the total number of the dispatched search-and-rescue equipment, wherein T is the transposition operator, wherein $t_i$ represents the dispatch time of the $i^{th}$ search-and-rescue equipment, and i=1, 2, ... n;

step 34: defining a dispatch waypoint matrix AW of the plurality of search-and-rescue equipment:

$$AW=[AW_1, AW_2, \ldots, AW_n]^T;$$

wherein n represents the total number of the dispatched search-and-rescue equipment, wherein T is the transposition operator, $AW_i$ represents a restriction to waypoints that the $i^{th}$ search-and-rescue equipment needs to be subjected to, and i=1, 2, ... n, wherein $AW_i$ represents a set of waypoints, which is expressed as:

$$AW_i=[w_{i1}, w_{i2}, \ldots, w_{ik}], (i=1,2, \ldots, n);$$

wherein k represents number of waypoints in the set, wherein with $w_{ij}$ represents the longitude and latitude coordinates of a waypoint, wherein i=1, 2, ... n and j=1, 2, ... k;

step 35: describing a mission allocation condition of a disposal solution, and defining a mission allocation matrix AM:

$$AM=[AM_1, AM_2, \ldots, AM_n]^T;$$

wherein n represents the total number of the dispatched search-and-rescue equipment, wherein T is the transposition operator, wherein $AM_i$ describes a situation that the $i^{th}$ search-and-rescue equipment executes a collaborative search-and-rescue mission, and i=1, 2, ... n, which is expressed as:

$$AM_i=[m_{i1}, m_{i2}, \ldots, m_{il}], (i=1,2, \ldots, n);$$

wherein l represents number of search-and-rescue modes of the $i^{th}$ search-and-rescue equipment, wherein the value of $m_{il}$ is 0 or 1, wherein mu represents the mission allocation condition of the $i^{th}$ search-and-rescue equipment, wherein 0 represents that mission mode is not executed, wherein 1 represents that the mission mode is executed;

step 36: obtaining the overall matrix RP for the search-and-rescue mission planning:

$$RP = [A, AT, AW, AM] = \begin{bmatrix} a_1 & t_1 & AW_1 & AM_1 \\ a_2 & t_2 & AW_2 & AM_2 \\ \vdots & \vdots & \vdots & \vdots \\ a_n & t_n & AW_n & AM_n \end{bmatrix}.$$

5. The method for planning collaborative search-and-rescue missions using a plurality of search-and-rescue equipment in medium to far sea areas of claim 4, wherein, step 4 further comprising the steps of:

defining the target function $f(RP)$ by taking average time of rescuing persons in danger as a target parameter, wherein the target function of the collaborative search-and-rescue mission is:

$$\min: f(RP) = \frac{1}{m}\sum_{s=1}^{m} r_s;$$

wherein $r_s$ represents the duration of $s^{th}$ person in danger from falling into water to be successfully rescued, wherein m represents the number of persons in danger, and s=1, 2 ... m; if the $s^{th}$ person in danger is not rescued successfully, the duration is calculated following the time of completing the collaborative search-and-rescue missions, and the time of completing the collaborative search-and-rescue missions is the time when each equipment completes all the collaborative search-and-rescue missions and returns.

* * * * *